United States Patent [19]

Legille et al.

[11] Patent Number: 4,820,105

[45] Date of Patent: Apr. 11, 1989

[54] APPARATUS FOR CHARGING A SHAFT FURNACE

[75] Inventors: Edouard Legille, Luxembourg; Emile Lonardi, Bascharage; Germain Schilz, L-Esch sur Alzette, all of Luxembourg

[73] Assignee: Paul Wurth, S.A., Luxembourg

[21] Appl. No.: 21,816

[22] Filed: Mar. 4, 1987

[30] Foreign Application Priority Data

Mar. 4, 1986 [LU] Luxembourg .......................... 86336

[51] Int. Cl.⁴ ...................... B66C 17/08; B65G 65/32

[52] U.S. Cl. ...................................... 414/200; 414/21; 414/161; 414/221; 414/292

[58] Field of Search .................. 222/56; 414/162, 167, 414/168, 169, 170, 21, 221, 160, 161, 200, 288, 292

[56] References Cited

U.S. PATENT DOCUMENTS

| | | | |
|---|---|---|---|
| 3,693,812 | 9/1972 | Mahr et al. | 414/200 X |
| 4,029,220 | 6/1977 | Greaves | 414/161 X |
| 4,042,130 | 8/1977 | Legille et al. | 414/199 |
| 4,071,166 | 1/1978 | Legille et al. | 414/21 X |
| 4,074,816 | 2/1978 | Legille | 414/21 |

*Primary Examiner*—Robert J. Spar
*Assistant Examiner*—Stuart J. Millman
*Attorney, Agent, or Firm*—Fishman, Dionne & Cantor

[57] ABSTRACT

The apparatus comprises a distribution spout and a hopper which has two containers mounted thereabove provided with sealing valves and a metering member. In order to simplify the weighing system, the hopper is independent of the mouth of the furnace and is located inside a sealed chamber. The hopper is suspended by a device which enables it to be coupled to the container which is being emptied and to be uncoupled from the container which is being filled.

8 Claims, 3 Drawing Sheets

APPARATUS FOR CHARGING A SHAFT FURNACE

BACKGROUND OF THE INVENTION

This invention relates to an installation for charging a shaft furnace. More particularly, this invention relates to a charging apparatus for a shaft furnace comprising a rotating or oscillating distribution chute or spout and a hopper with a central flow duct above the spout. The flow opening of the flow duct is controlled by a metering member which symetrically regulates the flow of charge material about the central axis of the furnace. Mounted above the metering member are two containers provided with upper and lower sealing valves, as well as a metering member for regulating the flow of charge material towards the hopper.

A charging apparatus of the general type described above is disclosed in patent application LU No. 85/879 corresponding to U.S. application Ser. No. 860,653 filed May 7, 1986, assigned to the assignee hereof. According to this patent application, the metering valve of a container is initially opened so as to cause the flow of a quantity of material which is sufficient to form a barrier of material above the flow duct of the hopper. Only after this barrier has been formed is the metering valve of the flow duct above the hopper opened. In order to control the formation of this barrier, and ensure that it is present for the entire duration of a charging operation, both the hopper and the container which communicates with the latter ar weighed separately throughout the entire charging operation. As a result, signals are generated, representing in each case the contents of the hopper, the contents of the container and the combined contents of the hopper and the container.

It will be appreciated that the objective of forming a barrier of charge materials inside the hopper is to ensure that the charging material falls vertically and centrally onto the spout; and thus prevent undesired horizontal and transverse component forces caused by the charge material sliding along the slanting wall inside the hopper.

As discussed above, in the prior art apparatus, it is necessary to weigh the hopper and the container separately, thereby unduly complicating the weighing operation and the method used to process the signals supplied by the scales. Moreover, several sections with bellows joints must be provided for the flexible connections. However, it is known that such bellows joints, constitute very sensitive connections and should be avoided as much as possible.

SUMMARY OF THE INVENTION

The above-discussed and other drawbacks and deficiencies of the prior art are overcome or alleviated by the shaft furnace charging apparatus of the present invention. In accordance with the present invention, an improved charging apparatus (relative to the prior art apparatus described above) is provided which enables the weighing system to be substantially simplified and leads to a reduction in the number and dimensions of bellows joints. In the present invention, the hopper is, from a static point of view, independent of the furnace mouth. This is accomplished by locating the hopper inside a sealed chamber mounted on a frame or on the furnace mouth; and suspending the hopper using means which enable it to be coupled to the container which is being emptied and uncoupled from the container which is being filled.

In accordance with a preferred embodiment of the present invention, the means for suspending the hopper comprises a first rod which is arranged axially above the hopper, the bottom end of which is connected, via a first cross-piece, to the top part of the hopper; and a second rod, independent of the first rod, which is hollow and arranged coaxially around the first rod, the bottom end of which is connected, via a second cross-piece, to the top part of the hopper. These two rods are fixed respectively, at their top ends, to first and second hydraulic cylinders which are respectively connected to each of the two containers. The hopper preferably includes flexible, horizontal stabilization means which do not impede its freedom of movement in the vertical direction.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
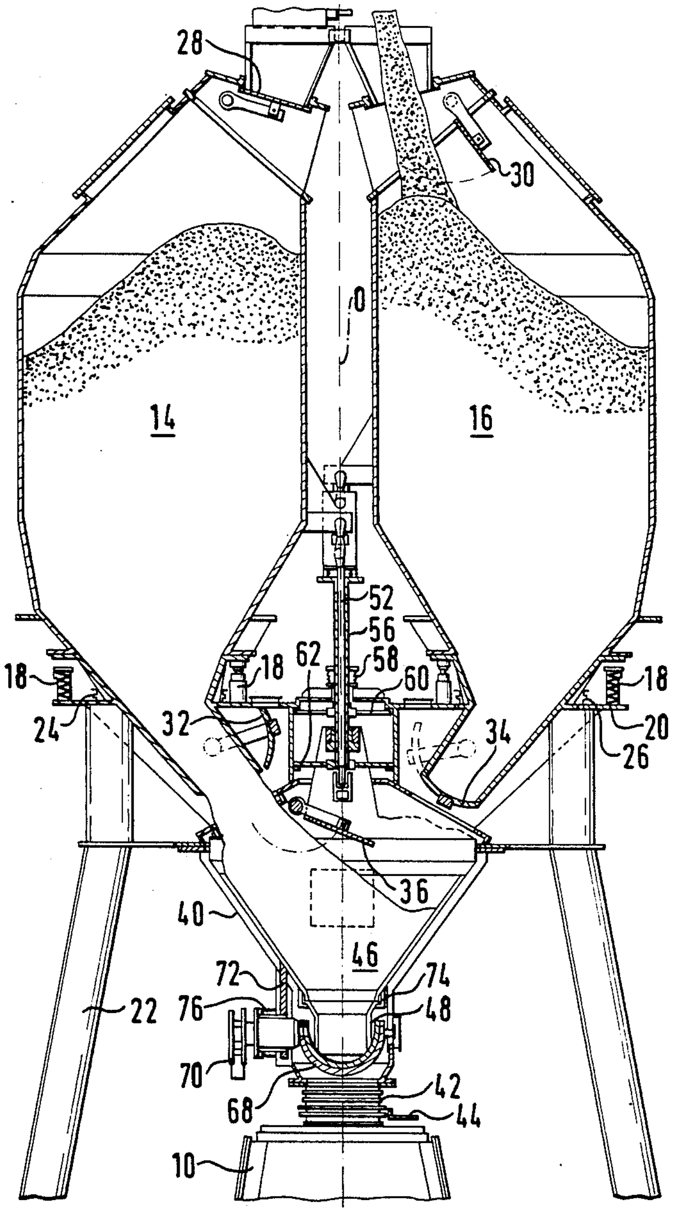
FIG. 1 is a vertical cross-sectional view of an apparatus in accordance with the present invention.

FIG. 1 shows the top portion of a housing 10 containing a mechanism for driving a rotating and oscillating spout for distributing charging material in a shaft furnace. The spout (not shown) is well known and is located inside the top of the shaft furnace. Two storage containers 14 and 16 are arranged next to each other on either side of the vertical axis 0 of the furnace. Containers 14 and 16 rest on scales 18 mounted on base or platform structure 20 which is supported by a frame 22. Frame 22 is positioned on the wall of the furnace. In order that containers 14 and 16 may be independently weighed, neither container has any parts connecting them to base 20, apart from flexible plates 24 and 26 which ensure their horizontal stability, but which do not affect their vertical freedom of movement in relation to scales 18 and platform 20.

Containers 14 and 16 are provided, in a manner known per se, with upper sealing valves 28 and 30, lower check valves 32 and 34, as well as lower sealing valves. It will be appreciated that only the sealing valve 36 associated with container 14 is shown in FIG. 1.

Between the two containers 14 and 16 is a sealed chamber 40 which can be connected to each of containers 14 and 16 by opening the lower sealing valve 36. Sealed chamber 40 is connected to the inside of the furnace through housing 10 by means of the only bellows joint required in the installation (bellows joint 42), which is necessary for operation of a sliding gate 44 provided immediately above housing 10. Sealed chamber 40 has an interior hopper 46 preferably in the form of a funnel provided with a lower flow duct 48 (see also FIG. 2).

Figure 2:
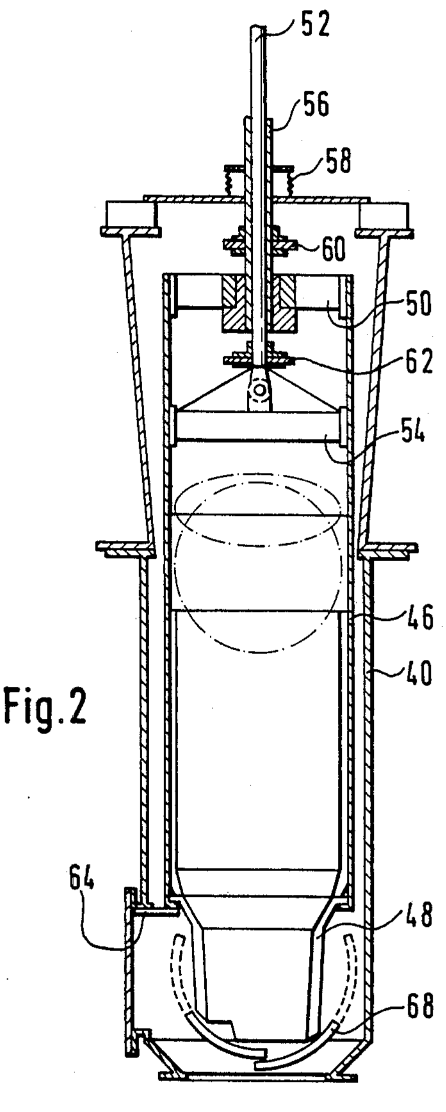
FIG. 2 is an axial vertical cross-sectional view through the hopper of FIG. 1 rotated through 90 degrees in relation to the view shown in FIG. 1.

Turning now to FIG. 2, in accordance with an important feature of the present invention, hopper 46 is freely suspended, by means of a first cross-piece 50, from a first axial rod 52 extending along the central axis 0; and by means of a second cross-piece 54, from a second axial rod 56 which is hollow and which is arranged coaxially around first rod 52, while being completely independent of the latter. Rods 52 and 56 extend from sealed chamber 40 through a sealing bellows 58 which surrounds, in sealed fashion, external rod 56 without impeding its freedom of vertical movement. Inside chamber 40, each of rods 52 and 56 is connected to the walls of the chamber by flexible plates 60 and 62 (see FIG. 1) which ensure the horizontal stability of hopper 46 without impeding its vertical freedom of movement. Hopper 46 is additionally stabilized by a flexible plate 64 connecting it to the wall of chamber 40.

A metering valve 68 and its associated actuating or drive mechanism 70 are also mounted on hopper 46 by means of vertical skirts 72 and 74 integral with the latter. The drive shafts connecting drive mechanism 70 to valve 68 pass through the lower wall of chamber 40 with the aid of a flexible sealing device 76 which allows metering valve 68 and its drive mechanism 70 to retain their freedom of vertical movement.

Figure 4:
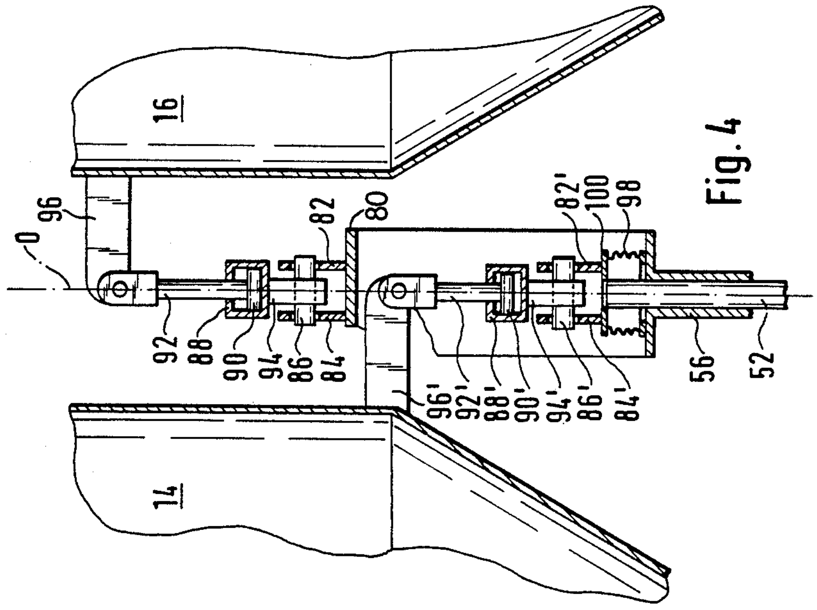
FIGS. 3 and 4 are front elevation views of a system for suspending the hopper, respectively showing the parts coupling the latter to each of the two containers.
Figure 3:
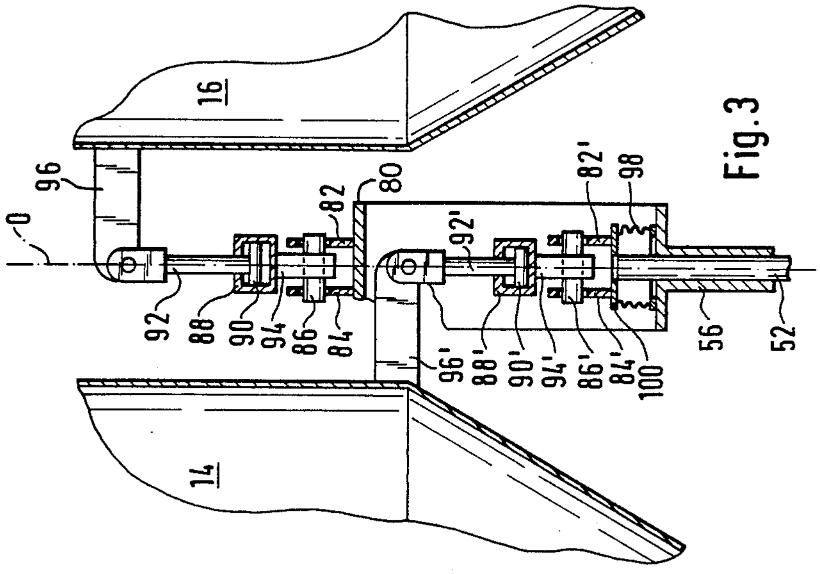

A more detailed description now follows, with reference to FIGS. 3 and 4, of the means and method for suspension of hopper 46 and the way in which it is coupled to either container 14 or container 16. The top end of hollow rod 56 is integral with a bracket 80, the top of which supports two parallel lugs 82 and 84 through which there passes a trunnion 86 which is freely moveable about its horizontal axis inside lugs 82 and 84.

Trunnion 86 is connected by an eyelet 94 to a hydraulic cylinder 88. The rod 92 of the piston 90 of cylinder 88 is coupled to container 16 by means of a horizontal bar 96 integral with container 16. The top end of rod 52 is connected, in turn, to container 14 in the same manner as bracket 80 is connected to container 16. Accordingly, in illustrating the method of connection of rod 52 to container 14, the same references, with primes, have been used as those used for the corresponding parts coupling bracket 80 to container 16.

Since rod 52 is freely movable in relation to hollow rod 56, the annular space between these rods allowing this freedom of movement is subject to the pressure prevailing inside hopper 46. Consequently, it is necessary to provide a flexible sealing joint between the end 100 of internal rod 52 and the bottom of bracket 80 which is integral with external rod 56.

Operation of alternative methods of coupling hopper 56 to container 14 and to the container 16 will now be described with reference to FIGS. 3 and 4. In the case of FIG. 3, the annular space around rod 92' of piston 90' is filled with hydraulic fluid under pressure which thus supports cylinder 88' as well as rod 52. I other words, hopper 46 as well as its metering valve 68 and drive mechanism 70 driving the latter are coupled to container 14 in such a way that the weight of container 14, determined via scales 18, provides an indication of the contents of container 14 and of the contents of hopper 46.

Conversely, cylinder 88 is not under pressure, i.e., it is freely movable in relation to its piston 90 and the weight of hopper 46 has no effect on container 16. The latter, as shown in FIG. 1, is being filled, so that scales 18 provide signals which indicate the extent to which it is filled.

When container 16 has been filled and container 14 has been emptied via hopper 46, their functions must be reversed by operating the various valves so as to allow container 14 to be filled and container 16 to be emptied. It is at this point that hopper 46 is uncoupled from container 14 and coupled to container 16. For this purpose, the annular space around rod 92 of piston 90 is pressurized in order to support cylinder 88. Cylinder 88 therefore supports, via bracket 80, both rod 56 and hopper 46 which is now coupled to container 16. At the same time, the pressure inside cylinder 88' is released, thereby resulting in cylinder 88' and hopper 46 being uncoupled from container 14.

Instead of coupling piston rods 92 and 92' to containers 16 and 14 so that rods 56 and 52 are supported by cylinders 88 and 88' respectively, it will be appreciated that cylinders 88 and 88' may be coupled to containers 16 and 14 so that the rods 56 and 52 are supported by their piston rods 92 and 92' respectively.

While preferred embodiments have been shown and described, various modifications and substitutions may be made thereto without departing from the spirit and scope of the invention. Accordingly, it to be understood that the present invention has been described by way of illustrations and not limitation.

What is claimed is:

1. A charging apparatus for a shaft furnace comprising a rotating or oscillating distribution spout, a hopper with a flow duct above the spout, the flow opening of the flow duct being controlled by a first metering member, at least two containers mounted above the discharge duct, each container being provided with upper and lower sealing valves and a metering member for regulating the flow of charge material towards the hopper, and further including:

frame means on said furnace;

a sealable chamber mounted on said frame means, said hopper being located in said sealable chamber; and suspension means for suspending said hopper wherein said hopper is selectively physically connected to one of the containers which is being emptied of charge material and physically disconnected from the other container which is being filled with charge material.

2. The apparatus according to claim 1 wherein said hopper has a top portion and wherein said means for suspending said hopper comprises:

a first cross-piece;

a first rod which is axially aligned above said hopper, said rod having a bottom end which is connected by said first cross-piece to the top portion of said hopper;

a second cross-piece;

a second hollow rod coaxially surrounding said first rod, said second rod having a bottom end which is connected by said second cross-piece to the top portion of said hopper; and wherein said first and second rods are respectively connected to a first and a second hydraulic cylinder, each of said cylinders being respectively connected to each of said two containers.

3. The apparatus according to claim 1 including:

horizontal stabilization plates, said hopper being connected to said sealable chamber by said stabilization plates.

4. The apparatus according to claim 2 including:

horizontal stabilization plates, said hopper being connected to said sealable chamber by said stabilization plates.

5. The apparatus according to claim 1 wherein said first metering member includes an associated drive mechanism and wherein:

said first metering member and drive mechanism are mounted on said hopper, said first metering member being connected to its associated drive mechanism through the wall of said sealable chamber; and a flexible joint between said first metering member and its associated drive mechanism.

6. The apparatus according to claim 2 wherein said first metering member includes an associated drive mechanism and wherein:

said first metering member and drive mechanism are mounted on said hopper, said first metering member being connected to its associated drive mechanism through the wall of said sealable chamber; and a flexible joint between said first metering member and its associated drive mechanism.

7. The apparatus according to claim 3 wherein said first metering member includes an associated drive mechanism and wherein:

said first metering member and drive mechanism are mounted on said hopper, said first metering member being connected to its associated drive mechanism through the wall of said sealable chamber; and a flexible joint between said first metering member and its associated drive mechanism.

8. The apparatus according to claim 4 wherein said first metering member includes an associated drive mechanism and wherein:

said first metering member and drive mechanism are mounted on said hopper, said first metering member being connected to its associated drive mechanism through the wall of said sealable chamber; and a flexible joint between said first metering member and its associated drive mechanism.

* * * * *